US012791445B2

(12) United States Patent
Long

(10) Patent No.: US 12,791,445 B2
(45) Date of Patent: Nov. 10, 2026

(54) ONBOARD AIRCRAFT WEIGHT AND BALANCE DETECTION SYSTEM

(71) Applicant: THE BOEING COMPANY, Arlington, VA (US)

(72) Inventor: Michael Allan Long, Langley, WA (US)

(73) Assignee: THE BOEING COMPANY, Arlington, VA (US)

( * ) Notice: Subject to any disclaimer, the term of this patent is extended or adjusted under 35 U.S.C. 154(b) by 419 days.

(21) Appl. No.: 18/463,073

(22) Filed: Sep. 7, 2023

(65) Prior Publication Data

US 2025/0085195 A1 Mar. 13, 2025

(51) Int. Cl.

| | |
|---|---|
| ***G01M 17/04*** | (2006.01) |
| ***B64D 45/00*** | (2006.01) |
| ***G01G 19/07*** | (2006.01) |
| ***G01M 1/12*** | (2006.01) |

(52) U.S. Cl.

CPC ............. *G01M 17/04* (2013.01); *B64D 45/00* (2013.01); *G01G 19/07* (2013.01); *G01M 1/125* (2013.01)

(58) Field of Classification Search

CPC ...... G01M 17/04; G01M 1/125; B64D 45/00; B64D 47/02; B64D 43/00; G01G 19/07; B64C 25/58

See application file for complete search history.

(56) References Cited

U.S. PATENT DOCUMENTS

| | | | | |
|---|---|---|---|---|
| 2,443,045 | A | 6/1948 | Magruder et al. | |
| 5,214,586 | A | 5/1993 | Nance | |
| 5,548,517 | A * | 8/1996 | Nance | G01M 1/125 702/175 |
| 6,237,406 | B1 | 5/2001 | Nance | |
| 7,969,244 | B2 | 6/2011 | Rao et al. | |
| 8,340,892 | B2 * | 12/2012 | Long | G01G 19/07 73/65.06 |
| 11,416,871 | B2 | 8/2022 | Nance | |
| 2019/0186984 | A1 | 6/2019 | Kirk et al. | |

OTHER PUBLICATIONS

SAE Aerospace, Aerospace Recommended Practice, "Flight Deck Panels, Controls, and Displays," ARP 4102, Jul. 1988, https://www.sae.org/standards/content/arp4102/, pp. 1-12.

Society of Automotive Engineers, Inc. Aerospace Recommended Practice, "Requirements for Aircraft on Board Weight and Balance System," ARP 1409, Jan. 1978, https://www.sae.org/standards/content/arp1409/, pp. 1-5.

Extended European Search Report for application No. 24198639.7 dated Jan. 24, 2025, pp. 1-8.

* cited by examiner

*Primary Examiner* — Timothy P Graves

(74) *Attorney, Agent, or Firm* — Moore IP Law

(57) ABSTRACT

A method includes obtaining pressure data and temperature data for gas in respective ones of shock struts of a plurality of landing gear. The method includes determining, for each shock strut for a first time corresponding to an end of a first change in gas pressure due to movement of a piston of the shock strut during loading or unloading of the aircraft, a friction value associated with the shock strut based on a gas pressure and a gas temperature at the first time. The method also includes computing, for a particular time before the loading or the unloading of the aircraft causes a second change in gas pressure of one or more of the shock struts, a weight of the aircraft based on the gas pressures of the shock struts at the first times and the friction values associated with the shock struts at the first times.

20 Claims, 6 Drawing Sheets

ONBOARD AIRCRAFT WEIGHT AND BALANCE DETECTION SYSTEM

FIELD OF THE DISCLOSURE

The present disclosure is generally related to an onboard aircraft weight and balance detection system for an aircraft.

BACKGROUND

A weight of an aircraft and balance of the aircraft are factors affecting aircraft safety. An aircraft that weighs more than an acceptable gross weight, that is unbalanced (e.g., an aircraft with a center of gravity (CG) outside of allowable limits), or both, can be both inefficient and unsafe. Weight and balance of the aircraft influence many factors associated with a flight of the aircraft including fuel needed for the flight, runway lengths needed for takeoff and landing, horizontal stabilizer settings, handling characteristics, etc. Weight scales may be used to determine the weight and the balance of the aircraft. Having weight scales at each location where aircraft are loaded and unloaded would be impractical due to expense, aircraft configuration differences among models of aircraft, maintenance needed for the weight scales, and other factors. It is desirable for an aircraft (e.g., a passenger aircraft or a cargo aircraft that includes a landing gear system with pneumatic shock struts) to include a system that enables a computer system of the aircraft to determine the weight and balance of the aircraft based on sensor data obtained from sensors coupled to the aircraft.

SUMMARY

In a particular implementation, an aircraft includes a plurality of landing gear. Each landing gear of the plurality of landing gear includes a shock strut. The aircraft includes a plurality of sensors associated with each landing gear. The plurality of sensors includes a pressure sensor configured to generate pressure data indicative of a gas pressure in the shock strut, and a temperature sensor configured to generate temperature data indicative of gas temperature in the shock strut. The aircraft also includes a computer system. The computer system is configured to determine, for each shock strut of the plurality of landing gear for a first time corresponding to an end of a first change in the gas pressure due to movement of a piston of the shock strut during loading or unloading of the aircraft, a friction value associated with the shock strut based on the gas pressure at the first time indicated by the pressure data and a gas temperature at the first time indicated by the temperature data. The computer system is configured to compute, for a particular time before the loading or the unloading of the aircraft causes a second change in gas pressure of one or more of the shock struts as indicated by the load sensor data for the shock struts, a weight of the aircraft based on the gas pressures of the shock struts at the first times and the friction values associated with the shock struts at the first times. The computer system is also configured to provide, to one or more display devices, first output that indicates the weight of the aircraft.

In another particular implementation, a method of determining weight of an aircraft having a plurality of landing gear includes obtaining, at a computer system, pressure data and temperature data for gas in respective ones of shock struts of the plurality of landing gear during loading or unloading of the aircraft. The method includes determining, at the computer system for each shock strut of the plurality of landing gear for a first time corresponding to an end of a first change in gas pressure due to movement of a piston of the shock strut during the loading or the unloading of the aircraft, a friction value associated with the shock strut based on a gas pressure at the first time indicated by the pressure data and a gas temperature at the first time indicated by the temperature data. The method also includes computing, at the computer system at a particular time before the loading or the unloading of the aircraft causes a second change in gas pressure of one or more of the shock struts as indicated by the load sensor data for the shock struts, a weight of the aircraft based on the gas pressures of the shock struts at the first times and the friction values associated with the shock struts at the first times.

In another particular implementation, a non-transitory computer-readable medium includes instructions executable by one or more processors associated with an aircraft. The instructions are executable by the one or more processors to obtain pressure data and temperature data for gas in respective ones of shock struts of landing gear of the aircraft during loading or unloading of the aircraft. The instructions are executable by the one or more processors to obtain an attitude of the aircraft. The instructions are executable by the one or more processors to obtain load sensor data from load sensors associated with each landing gear. The load sensor data for each landing gear corresponds to vertical load exerted by the landing gear on the aircraft. The instructions are executable by the one or more processors to determine for each shock strut for a first time corresponding to an end of a first change in gas pressure due to movement of a piston of the shock strut during the loading or the unloading of the aircraft, a friction value associated with the shock strut based on a gas pressure at the first time indicated by the pressure data and a gas temperature at the first time indicated by the temperature data. The instructions are executable by the one or more processors to determine for each shock strut for a particular time before the loading or the unloading of the aircraft causes a load change of one or more of the shock struts as indicated by the pressure data for the shock struts, a load delta value for each shock strut at the particular time. The instructions are executable by the one or more processors to compute, for the particular time, a weight of the aircraft based on the attitude, the gas pressures, the friction values associated with the shock struts, the load delta values associated with the shock struts at the particular time, and unsupported weights of components of each landing gear not supported by the gas pressure in the shock strut for each of the shock struts at the particular time. The instructions are also executable by the one or more processors to provide, to one or more display devices, first output that indicates the weight of the aircraft.

The features, functions, and advantages described herein can be achieved independently in various implementations or may be combined in yet other implementations, further details of which can be found with reference to the following description and drawings.

DETAILED DESCRIPTION

Figure 1:
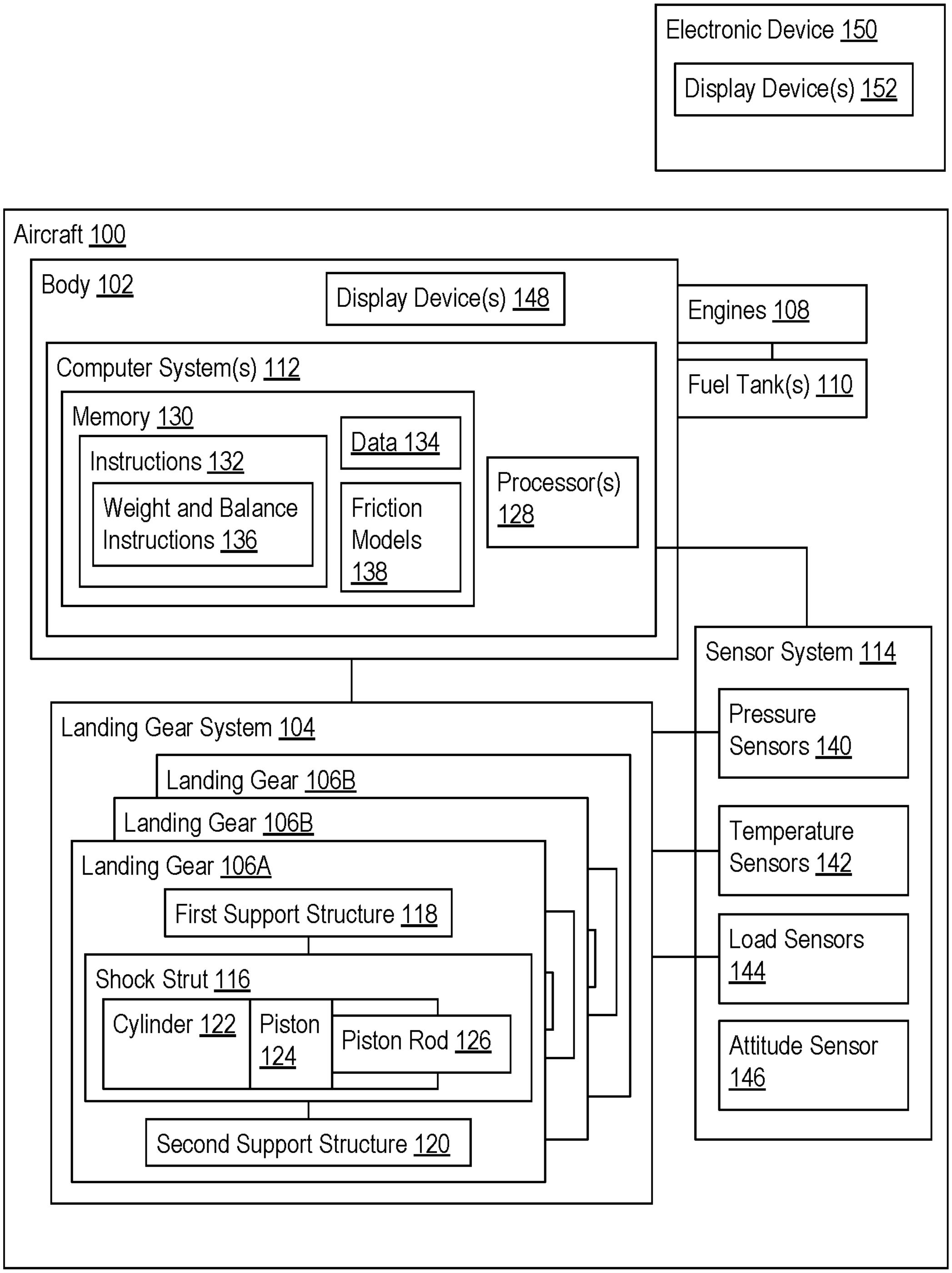
FIG. 1 depicts a block diagram of an aircraft.

The present disclosure describes onboard weight and balance systems for aircraft (e.g., aircraft configured to transport passengers, cargo, or both, where the aircraft includes a landing gear system having pneumatic shock struts). A weight and balance system of an aircraft utilizes measured gas temperature and gas pressure of shock struts of landing gear and load sensor data that provides information about loads applied by the landing gear to the aircraft to determine loads applied to shock struts of the landing gear. Load sensors are configured to generate the load sensor data that is associated with vertical loads applied by the landing gear to the aircraft. The weight of the aircraft and a CG of the aircraft is determined based on the loads applied to the shock struts of the landing gear when the shock struts are in a static state (i.e., a piston of each shock strut is not in motion relative to a cylinder of the shock strut).

Each shock strut of the landing gear system of the aircraft supports a portion of the weight of the aircraft. A shock strut can be modeled as a piston and cylinder system with a gas between the piston and a cylinder end, where the piston is able to move relative to the cylinder end based on a load applied to the shock strut. The load is opposed by a first force that the gas applies to the piston and the end of the cylinder and a friction force acting between the cylinder and the piston in a direction opposite to a direction of travel of the piston that the first force causes or tries to cause. The first force is equal to an effective surface area of the piston multiplied by the gas pressure. When the piston is not moving relative to the cylinder, the shock strut is a static system, the gas pressure is constant, and the friction force is a static friction force. The static friction force is directly proportional to the load (i.e., a magnitude of the static friction force equals a coefficient of static friction multiplied by the load) and resists movement of the piston up to a compression breakout friction force when the load applied to the piston increases, or down to an expansion breakout friction force when the load applied to the piston is reduced.

When the load applied to the shock strut is increased while the shock strut is in a static state, the static friction force acts to resist movement of the piston toward the cylinder end. The static friction force increases as the load increases up to a compression breakout friction force, and the gas pressure of the shock strut does not change. If the load is further increased when the static friction force is at the compression breakout friction force, the shock strut becomes a dynamic system and the friction force becomes a dynamic friction force. The dynamic friction force is directly proportional to the load (i.e., a magnitude of the dynamic friction force equals a coefficient of kinetic friction, which is less than the coefficient of static friction, multiplied by the load) and acts in a direction opposite to a direction of movement of the piston. The change from static friction to dynamic friction results in movement of the piston toward the cylinder to compress the gas (i.e., the gas pressure increases). The piston continues to move until the load is balanced by the first force plus the friction force. When the load is balanced by the first force plus the friction force, the system becomes a static system. When the shock strut is in a dynamic state, the friction force is dynamic friction which instantly changes to static friction at the moment the shock strut transitions to a static state, so that the load is balanced by the first force and the friction force. The piston will not move again if the load is changed until another compression breakout friction force is exceeded due to application of additional load to the shock strut, or until an expansion breakout friction force is crossed due to reduction of the applied load to the shock strut.

When the load applied to the shock strut is reduced while the shock strut is a static system, the static friction force acts to resist movement of the piston away from the cylinder end. The static friction force becomes less as the load is reduced until the static friction force reaches an expansion breakout friction force, and the gas pressure of the shock strut does not change. If the load is further reduced when the static friction force is at the expansion breakout friction force, the shock strut transitions to a dynamic state and the friction force becomes a dynamic friction force which is less than the expansion breakout friction force due to the coefficient of dynamic friction being less than the coefficient of static friction, and the piston will move away from the cylinder end and allow the gas to expand (i.e., the gas pressure is reduced). The dynamic friction force acts in the direction opposite to the direction of travel of the piston. The piston will continue to move until the load and the dynamic friction force balance the first force. When the load and the dynamic friction force balance the first force, the system becomes a static system again, and the dynamic friction at the moment the piston stops moving becomes the static friction, so that the load is balanced by the first force and the static friction. The piston will not move again if the load is changed until a compression breakout friction force is exceeded due to application of additional load to the shock strut, or until another expansion breakout friction force is crossed due to further reduction of the applied load to the shock strut.

Gas pressure data for the shock strut is analyzed to determine a time when the shock strut transitions from a dynamic state to a static state. During a first static state the gas pressure is at a substantially constant first value. When the shock strut transitions from the first static state to the dynamic state, the gas pressure data shows rapid change. When the shock strut transitions from the dynamic state to a second static state at the time, the gas pressure reaches a substantially constant second value. At that time, the friction force can be determined using a friction force model, and the load at the time can be determined as the first force (i.e., pressure times effective surface area of the piston) plus the friction force. The magnitude of the friction force is a function of gas temperature and gas pressure. The friction force is a positive value when the load that caused the shock strut to transition to the dynamic state was due to loading the shock strut (i.e., the pressure increased during the dynamic state) and the friction force is a negative value when the load that caused the system to transition to the dynamic state was due to unloading the shock strut (i.e., the pressure decreased during the dynamic state).

A gas temperature and gas pressure of the shock strut at the time when gas temperature data and gas pressure data indicates that the shock strut transitioned from the dynamic state to the static state are provided to the friction force model, and the friction force model returns the friction force based on data from one or more tables, based on one or more equations, or both. Data in the one or more tables and values of parameters for the one or more equations can be based on experimental data for the shock strut (e.g., experimental data for the particular shock strut, or average values determined for a general shock strut corresponding to the particular shock strut), can be theoretically determined, or both. When the shock strut is a shock strut of a landing gear of an aircraft, the weight of the aircraft and the CG at the time can be determined based on the load of the shock strut at the time. Additional load data from load sensors associated with the shock strut is used to determine a load delta value for the shock strut during a time period when the shock strut remains in a static state after the time. The weight and CG of the aircraft are continuously determined during loading and unloading of the aircraft when each shock strut is in a static state based on a particular time for each shock strut when the shock strut transitions from a dynamic state to a static state, and based on load delta values determined while the shock struts remain in the static state. At the particular time for a shock strut, the load delta value is zero, and the load delta value subsequently changes if the aircraft is loaded or unloaded.

A weight and balance system for an aircraft that determines the weight and CG of the aircraft based on a particular time for each shock strut when the shock strut transitions from a dynamic state to a static state provides repeatable, reliable, and accurate determination of a weight and CG of the aircraft while the aircraft is situated on the ground. The onboard weight and balance system has a technical advantage of eliminating the need for weight scales at locations where aircraft are loaded and unloaded. The weight and CG are determined by a computer system (e.g., a flight control computer system of the aircraft) based on sensor data from sensors of the aircraft. Another technical advantage is that the computer system can provide a warning to a flight crew, inhibit flight of the aircraft (e.g., change a status of the aircraft to a grounded status), or both, if the weight of the aircraft or the CG of the aircraft are outside of acceptable threshold values (e.g., a determined weight of the aircraft exceeds a weight threshold or a determined location of the CG is outside of a threshold CG region). If the computer system inhibits flight of the system, a member of the flight crew may perform one or more actions (e.g., provide user input via one or more input devices) to override the inhibition and allow flight of the aircraft.

The sensors of the aircraft include a pressure sensor and a temperature sensor for each shock strut of a landing gear system including a plurality of landing gear (e.g., a nose landing gear, a right main landing gear, and a left main landing gear). The shock struts are pneumatic shock struts, and the pressure sensor and the temperature sensor for a shock strut provide pressure data and temperature data associated with a gas (e.g., nitrogen) of the shock strut.

The sensors also include load sensors (e.g., variable reluctance strain sensors) configured to provide load data for loads applied by the landing gear to the aircraft above the shock struts. In an implementation, two load sensors are coupled to a left trunnion vertical beam and two load sensors are coupled to a right trunnion vertical beam associated with the nose landing gear, two load sensors are coupled to a main landing gear beam of the right main landing gear, and two load sensors are coupled to a main landing gear beam of the left main landing gear. While a load value indicated by load sensor data may not provide a repeatable and accurate value of a load at a particular time without frequent calibration of the load sensors, the load sensors can be used to determine load delta values that are reliable and accurate for a time period between a first time and a second time that indicate a load change. When the aircraft undergoes routine maintenance, a determination may be made regarding the accuracy of the load delta values generated by the load sensors of the aircraft by determining the weight of the aircraft at a first time, adding a known weight at a second time, and determining a second weight of the aircraft after the second time and before the weight of the aircraft is additionally changed. If the value of second weight is not the first weight plus the known weight within acceptable error limits, one or more of the load sensors are faulty and additional procedures can be initiated to identify and replace faulty load sensors.

The figures and the following description illustrate specific exemplary implementations. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple landing gear of a landing gear system 104 are illustrated and associated with reference numbers 106A and 106B. When referring to a particular one of these landing gear, such as the landing gear 106A, the distinguishing letter "A" is used. However, when referring to any arbitrary one of these landing gear, the reference number 106 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, some features described herein are singular in some implementations and plural in other implementations. To illustrate, FIG. 1 depicts an aircraft 100 including one or more computer systems 112, which indicates that in some implementations the aircraft 100 includes a single computer system 112 and in other implementations the aircraft 100 includes multiple computer systems 112. For ease of reference herein, such features are generally introduced as "one or more" features and are subsequently referred to in the singular unless aspects related to multiple of the features are being described.

The terms "comprise." "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first." "second." "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements. As used herein, A "and/or" B may mean that either "A and B", or "A or B", or both "A and B" and "A or B" are applicable or acceptable.

As used herein, "generating," "calculating." "using." "selecting." "accessing." and "determining" are interchangeable unless context indicates otherwise. For example, "generating." "calculating." or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

FIG. 1 depicts a block diagram of an aircraft 100. The aircraft 100 includes a body 102 (e.g., a fuselage, wings, a tail section, etc.), a landing gear system 104 with a plurality of landing gear 106 coupled to the body 102, engines 108 coupled to the body 102 to power the aircraft 100, one or more fuel tanks 110 configured to hold fuel for the one or more engines 108, one or more computer systems 112 within the body 102, and a sensor system 114 configured to provide data to the computer system 112.

The landing gear system 104 includes a nose landing gear 106A and right and left main landing gear 106B. Each landing gear 106 includes a shock strut 116 coupled to the body 102 by first support structure 118 and contacting the ground when not in flight via second support structure 120 (e.g., wheels, axles, supports, brakes, etc.). Each shock strut 116 is a pneumatic shock strut that includes a cylinder 122, a piston 124 configured to travel in the cylinder 122, and a piston rod 126 coupled to the piston 124. The cylinder 122 is coupled to one of the structures 118, 120 (e.g., the first support structure 118) and the piston rod 126 is coupled to the other structure 120, 118 (e.g., the second support structure 120). A gas (e.g., nitrogen) in the cylinder 122 is compressed or expanded by movement of the piston 124 relative to the cylinder 122.

Each shock strut 116 supports a portion of the weight of the aircraft 100. The gas of a shock strut 116 applies a force to a piston 124 of the shock strut 116 equal to an effective surface area of the piston 124 multiplied by the gas pressure of the shock strut 116. The portion of the weight of the aircraft 100 supported by the shock strut 116 does not include a weight of components of the landing gear associated with the shock strut 116 not supported by gas pressure applied to the piston 124, which includes the weight of the second support structure 120 and the weight of components of the shock strut 116 coupled to the second support structure 120 (e.g., the piston 124 and the piston rod 126 of the shock strut 116 when the piston rod 126 is coupled to the second support structure 120).

The computer system 112 may be a flight control computer or other type of computer system associated with the aircraft 100. The computer system 112 includes one or more processors 128 and a memory 130. The memory 130 includes instructions 132 executable by the processor 128 and data 134. The instructions 132 include weight and balance instructions 136 configured to determine a weight of the aircraft 100 and a CG of the aircraft 100 when the aircraft 100 is on the ground and being loaded or unloaded. The weight and balance instructions 136 utilize friction models 138 associated with shock struts 116 of the landing gear system 104. The friction models 138 are stored in the memory 130. A friction model 138 associated with a particular shock strut 116 receives a pressure and temperature for the gas of the shock strut at a first time corresponding to when the shock strut 116 transitions from a dynamic state to a static state, and the friction model 138 outputs a friction force of the shock strut 116 at the first time. The friction models 138 can use look up tables based on experimental data and/or theoretical data, equations for the friction based on theory and/or experimental data, or both, to determine the friction force corresponding to the input pressure and temperature.

The data 134 includes values of parameters used by the weight and balance instructions 136. The values include values for angle parameters, weight parameters, other types of parameters, or combinations thereof. The angle parameters include a nose down tilt angle of the aircraft 100 relative to horizontal when the aircraft 100 is on level ground and values of angles of each of the landing gear 106 relative to vertical when the aircraft 100 is on level ground. The weight parameters include values associated with each landing gear for weight associated with the landing gear that is not supported by gas acting on the piston 124 (e.g., support structure, tires, etc.).

The data 134 also stores historic data for each shock strut (e.g., load data, pressure data and temperature data) for each loading and unloading operation the shock struts are subjected to. The computer system periodically adjusts the friction model 138 for a particular shock strut 116 based on the historic data for the particular shock strut stored by the computer system 112. The adjustment compensates for changes in shock strut friction with time.

The weight of the aircraft 100 and the CG are determined based on sensor data and parameters associated with the aircraft 100 retrieved from the data 134 in the memory 130. The parameters associated with the aircraft 100 include parameters used in calculations performed by the weight and balance instructions 136, the friction models 138, or both. The parameters include weight of components of each landing gear 106 not supported by gas pressure in the landing gear 106, an angle associated with each shock strut 116, and known positions of effective ground contact locations of the landing gear 106 as normal distances from ordinal axes of a coordinate system of interest that are used to determine the CG of the aircraft 100.

The sensor system 114 provides sensor data from sensors to the computer system 112 for storage in the data 134. The sensor data includes pressure data from pressure sensors 140, temperature data from temperature sensors 142, load sensor data from load sensors 144 associated with the landing gear system 104, and attitude data from one or more attitude sensors 146 associated with the aircraft 100. The computer system 112 includes one or more data filters for sensor data (e.g., the pressure data, temperature data, and load sensor data) that reduce fluctuations present in the sensor data. One or more pressure sensors 140 and one or more temperature sensors 142 are coupled to each shock strut of the landing gear system 104.

The load sensors 144 associated with a landing gear 106 are positioned so that the load sensor data indicates a vertical load applied by the aircraft 100 to the landing gear 106. The load sensors 144 are coupled to the aircraft 100 above the shock struts 116 to provide load data indicative of load added to the aircraft 100 or removed from the aircraft 100. The load may be associated with people getting on or off the aircraft, fuel added to the fuel tanks 110, fuel used by engines of the aircraft 100 while the aircraft 100 is on the ground, cargo being loaded onto or off of the aircraft 100, weight (e.g., weight of water) on one or more outside surfaces of the body 102, and other load sources.

The attitude sensor 146 can be part of an inertial navigation system of the aircraft 100. The attitude data from the attitude sensor 146 includes data indicating angles associated with a pitch relative to a horizontal side-to-side axis and a roll relative to a horizontal fore-aft axis of the aircraft 100. The weight and balance instructions 136 use appropriate trigonometric relations to compensate for any roll of the aircraft 100 relative to the horizontal fore-aft axis based on roll attitude data from the attitude sensor 146. The weight and balance instructions 136 also use appropriate trigonometric functions to compensate for any pitch of the aircraft 100 relative to the horizontal side-to-side axis based on the value of the nose down tilt angle of the aircraft 100 relative to horizontal when the aircraft 100 is on level ground stored in the data 134 and based on pitch attitude data from the attitude sensor 146.

The computer system 112 provides output of the weight and balance instructions 136 to output devices. The output devices include one or more display devices 148 of the aircraft 100, one or more external devices (e.g., a portable device associated with a load master tasked with loading or unloading the aircraft), audio devices, haptic devices, other types of output devices, or combinations thereof. The output can include the weight of the aircraft 100, the zero fuel weight of the aircraft 100 (i.e., weight minus fuel weight), the location of the center of gravity of the aircraft 100, warnings associated with the weight of the aircraft 100, warnings associated with the center of gravity of the aircraft 100, other information, or combinations thereof.

Figure 2:
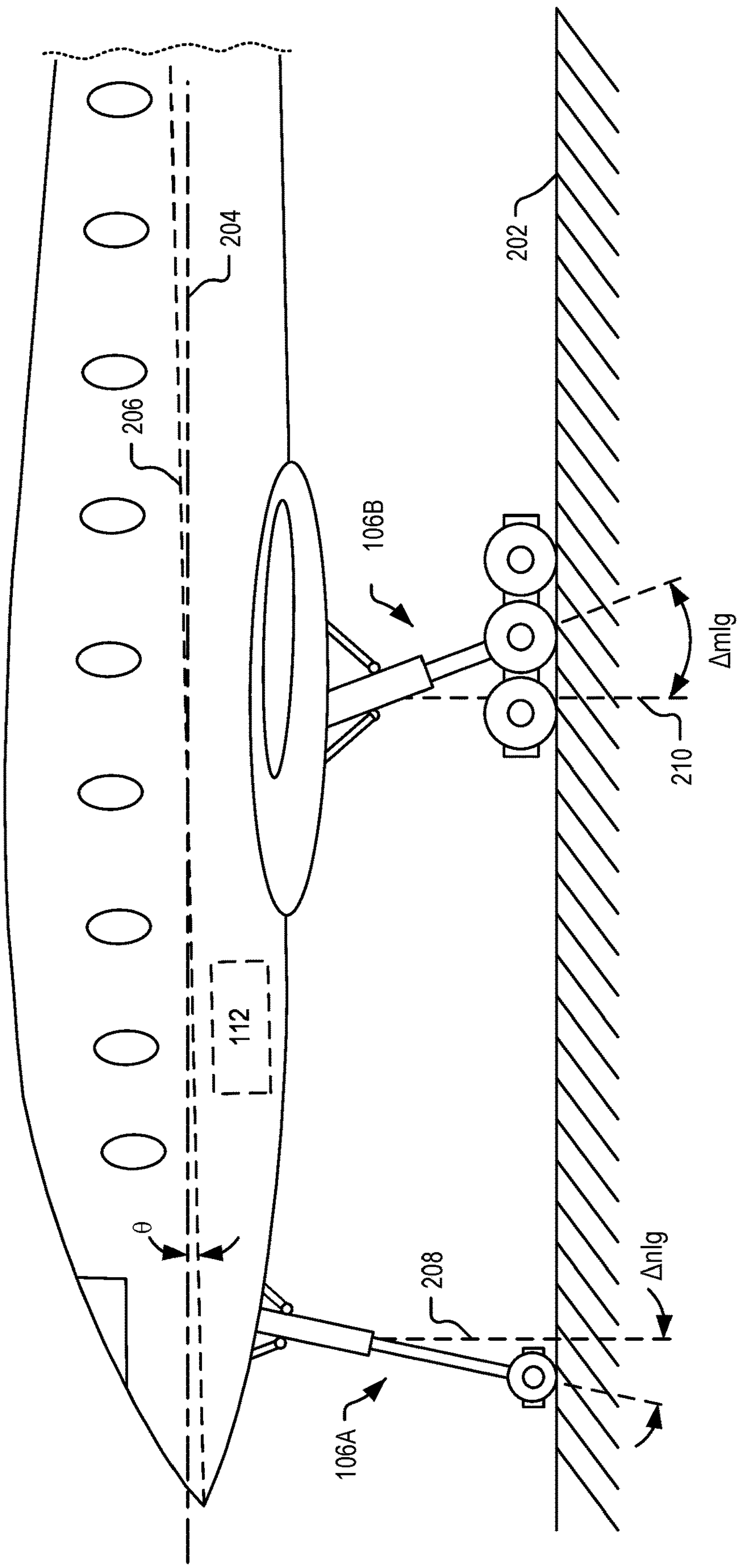
FIG. 2 depicts a side view representation of a portion of the aircraft.

FIG. 2 depicts a side view representation of a portion of the aircraft 100 on ground 202. The ground 202 depicted in FIG. 2 is level relative to a horizontal 204. In other situations, the ground 202 may be at a non-zero angle relative to the horizontal 204. The aircraft 100 includes a fore-aft axis 206. A parameter of the aircraft 100 is the tilt angle θ between the fore-aft axis 206 and the horizontal 204 when the aircraft 100 is on level ground, which is stored in the data 134 of the memory 130 of the computer system 112

The nose landing gear 106A is at a first angle, Δnlg, relative to a first axis 208 perpendicular to the fore-aft axis 206 of the aircraft 100. Each of the main landing gear 106B are at a second angle, Δmlg, relative to a second axis 210 perpendicular to the fore-aft axis 206 of the aircraft 100. Parameters of the aircraft 100 include values of Δnlg and Δmlg, which are stored in the data 134 of the memory 130 of the computer system 112.

The computer system 112 depicted in FIG. 2 is represented in dashed lines to indicate that the computer system 112 is not visible from the outside of the aircraft 100. The computer system 112, during execution of the weight and balance instructions 136 by the processor 128, determines angles of interest, which include angles of the landing gear 106 relative to the ground 202, from the attitude data, the value of the angle θ, the values of Δnlg and Δmlg, or combinations thereof. Appropriate trigonometric functions applied to the angles of interest are used in determining vertical components of forces applied to the landing gear 106 of the aircraft 100 during calculation of the weight of the aircraft 100 and the CG of the aircraft 100.

When the aircraft 100 is on the ground 202, not in motion, and being loaded or unloaded, the computer system 112 executes the weight and balance instructions 136 to determine the weight of the aircraft 100 and the CG of the aircraft 100. For a landing gear 106 of the landing gear system 104, execution of the weight and balance instructions causes the computer system 112 to analyze pressure data for the shock strut 116 of the landing gear 106 to determine a first time when the shock strut 116 transitions from a dynamic state to a static state. Based on the pressure and temperature at the first time determined from the pressure data and the temperature data, the weight and balance instructions 136 determine a friction force associated with the shock strut 116 at the first time using a friction model 138 for the shock strut 116.

The weight and balance instructions 136 determine the load applied to the shock strut 116 at the first time based on the force applied by the gas to the piston 124 (i.e., the pressure times the effective surface area of the piston 124) plus the friction force at the first time from the friction model 138 for the shock strut 116. When the load that caused the piston 124 of the shock strut 116 to move relative to the cylinder 122 was due to loading the shock strut 116, which is indicated by a pressure increase, the friction force is a positive value, and when the load that caused the shock strut 116 to move was due to unloading the shock strut 116, which is indicated by a pressure decrease, the friction force is a negative value.

A vertical component of the load applied to the shock strut 116 at the first time is determined from the load based on trigonometric values applied to angles associated with the aircraft 100 stored in the data 134. During a time period between the first time and a second time when analysis of the pressure data for the shock strut 116 indicates that the shock strut transitioned from the static state to a dynamic state, the weight and balance instructions 136 calculate load delta values for the shock strut 116 as the load value indicated by load data at a particular time in the time period less the load value indicated by the load data at the first time.

When the analysis of the pressure data indicates that the shock strut 116 transitioned from the static state to the dynamic state (i.e., the pressure increased when additional load was applied to the shock strut 116 or the pressure decreased when the load applied to the shock strut 116 was reduced), analysis of the pressure data is used to determine a new value for the first time where motion of the piston 124 relative to the cylinder 122 stops, and additional calculations performed for the landing gear 106 associated with the shock strut 116 are based on the new value for the first time. Typically a time of transition for a shock strut 116 from a first static state to a dynamic state and to a second static state occurs quickly (e.g., in less than 5 seconds) so there are no large time gaps when the computer system 112 cannot generate weight and CG for the aircraft 100 based on the pressure and temperature data of the shock struts 116 of the landing gear system 104.

The weight and balance instructions 136 also determine first times, vertical components of force applied to shock struts 116, and load delta values for each of the other shock struts 116 of the landing gear system 104. For each landing gear 106 of the landing gear system 104, the weight and balance instructions 136 calculate the vertical load of the landing gear 106 for times during the time period when the shock strut 116 of the landing gear 106 is in a static state (i.e., the gas pressure remains constant when the load applied to the shock strut changes). The vertical load for a landing gear 106 at a first particular time during the time period when the shock strut 116 of the landing gear 106 is in a static state is the vertical component of the load on the shock strut 116 at the first time when the shock strut 116 transitioned from a dynamic state to a static state (i.e., the time where the gas pressure reached a new constant value) plus the load delta value for the landing gear 106 at the first particular time, plus the weight of components of the landing gear 106 not supported by the gas pressure in the shock strut 116.

The weight and balance instructions 136 calculate the weight of the aircraft 100 and the CG of the aircraft 100 based on the vertical load of each of the landing gear 106 at a second particular time when all of the shock struts 116 of the landing gear system 104 are in the static state. The weight of the aircraft 100 at the second particular time is calculated as the sum of the vertical loads of each of the landing gear 106 at the second particular time.

The CG is a coordinate relative to an origin of an x, y, z aircraft coordinate system, where x is associated with a nose-to-tail direction, y is associated with a wingtip-to-wingtip direction, and z is associated with an elevation relative to the aircraft 100. Selection of the axes is arbitrary and other coordinate systems could be used. There is no change to the z coordinate of the CG when the aircraft 100 is on level ground 202 due to loading or unloading of the plane based on determinations of forces acting on the aircraft 100 at effective contacts points of the landing gear 106 with the ground 202. The change to the z coordinate of the CG when the aircraft 100 is on unlevel ground 202 due to loading or unloading of the aircraft 100 may be ignored and the coordinate system becomes an x, y coordinate system of interest.

The CG at the second particular time is based on the vertical loads of the landing gear 106, normal distances of the vertical loads from ordinal axes of the x-y coordinate system of interest, and the weight of the aircraft 100. The distance data of normal distances of effective ground contact locations of the landing gear 106 relative to the ordinal axes of the coordinate system of interest for the aircraft 100 is calculated based on the data 134 and the shock strut pressure. For example, an ordinal x-axis of the coordinate system corresponds to a central axis 206 of the aircraft 100 from the nose to the tail, and an ordinal y-axis of the coordinate system corresponds to a central axis perpendicular to the x-axis in a direction toward wingtips of the wings. To determine an x coordinate for the CG for the second particular time, for each landing gear 106, the computer system 112 calculates a first value as the product of vertical force on the landing gear 106 at the second time and the normal distance in the x, y plane of an effective ground contact locations of the landing gear 106 from the y ordinal axis. The x coordinate is the sum of the first values divided by the weight of the aircraft 100 at the second time. Similarly, to determine the y coordinate for the CG at the second particular time, for each landing gear 106, the computer system 112 calculates a second value as the product of vertical force on the landing gear 106 at the second time and the normal distance in the x, y plane of the effective ground contact locations of the landing gear 106 from the x ordinal axis. The y coordinate is the sum of the second values divided by the weight of the aircraft 100 at the second time.

The computer system 112 provides output based on the weight of the aircraft 100 and the CG of the aircraft 100. The output includes visual output to the display device 148 of the aircraft 100 (e.g., a display device 148 visible to flight crew of the aircraft 100). The visual output can include indicia (e.g., numerical values indicating the weight and the CG location), graphic indicia (e.g., a bar graph of the present weight relative to a maximum weight; a visual depiction of a top view of the aircraft 100 showing the location of the center CG, a normal CG region, a warning CG region, and an unacceptable CG region beyond the warning region; or combinations thereof), other information, or combinations thereof. The visual depiction can include color indicia that indicates that the value of the weight or the location of the CG is normal, is approaching a threshold value associated with the weight or a threshold region associated with the CG, or is at or over the threshold value associated with the weight or the threshold region associated with the CG. The output can also include audio output, haptic output, or both, when the value of the weight is at or over the threshold value associated with the weight of the aircraft 100, or when the CG is beyond the threshold region (e.g., an edge of the normal region). A member of the flight crew can provide user input to the computer system 112 that stops audio output, haptic output, or both.

In some implementations, the computer system 112 may be configured to change a status of the aircraft 100 to a grounded status (i.e., to a status that inhibits the aircraft 100 from taking off) in response to the weight of the aircraft 100 determined via use of the weight and balance instructions 136 being over a threshold weight, and may be configured to change the status of the aircraft to the grounded state in response to a location of the center of gravity of the being outside of a threshold region. Having the computer system 112 ground the aircraft 100 prevents unsafe use of the aircraft 100. The aircraft 100 can reset the setting to allow for flight of the aircraft 100 when the value for the weight returns to a value below threshold value, when the CG returns to a location within the threshold region, or both. Also, particular input provided by a member of the flight crew can override the setting and allow flight of the aircraft 100 when the computer system 112 sets the setting to the grounded state.

Figure 3:
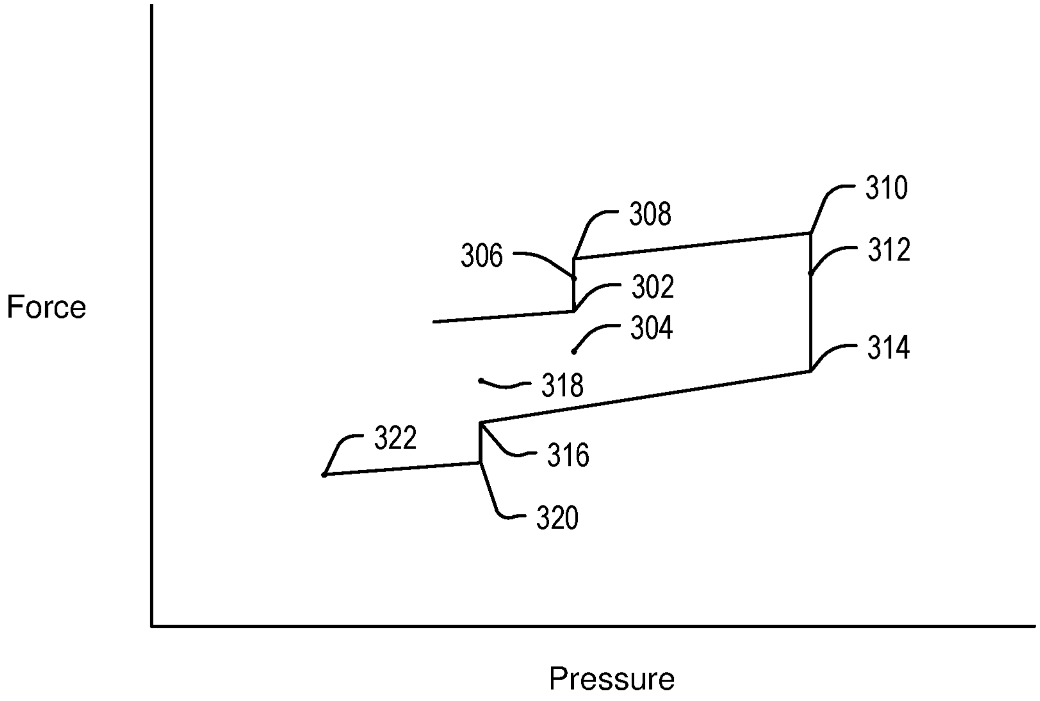
FIG. 3 depicts a force versus pressure diagram for a shock strut of an aircraft during loading and unloading of the aircraft for a particular scenario.

FIG. 3 depicts a force versus pressure diagram for a shock strut 116 of an aircraft 100 during loading and unloading of the aircraft 100 for a particular scenario. In a typical use scenario, the aircraft 100 is loaded or unloaded. In the scenario depicted in FIG. 3, the aircraft is first loaded and then unloaded to show both loading characteristics and unloading characteristics of the shock strut 116.

The aircraft 100 is located at a particular location and loading of the aircraft 100 is initiated. Pressure data for the shock strut 116 is analyzed and transition of the shock strut 116 to a static state at a time $t_1$ indicated in FIG. 3 as point 302 is detected. At time $t_1$, the load applied to the shock strut 116 is balanced by the force applied to the piston 124 of the shock strut 116 by the gas in the shock strut 116, which is the force corresponding to point 304 in FIG. 3, and the friction force, which corresponds to the dynamic friction force that caused motion of the piston 124 to stop at time $t_1$ and which instantly became the static friction when the motion stopped at time $t_1$. The computer system 112 is configured to use the friction model 138 to determine the friction force at time $t_1$, based on the pressure and temperature at time $t_1$. The computer system calculates the load $L_1$ at time $t_1$ based on the friction force and force applied to the piston 124 of the shock strut 116 by the gas in the shock strut 116.

Subsequent to time $t_1$, a first load is added to the shock strut 116 by loading of the aircraft 100 and the load applied to the shock strut 116 is $L_2$ at time $t_2$ and is indicated by the force corresponding to point 306 of FIG. 3. The first load causes the static friction to rise to a value below a first breakout compression friction force. The first breakout compression friction force is shown as the force corresponding to point 308. The load $L_2$ at time $t_2$ is determined by the computer system 112 by determining the load delta value based on load sensor data for time $t_2$ and time $t_1$ and adding the load delta value to the load value $L_1$ determined for time $t_1$. The load on the shock strut 116 at any time up to application of a load that exceeds the first breakout friction force can be similarly determined.

Subsequent to time $t_2$, a second load is added to the shock strut 116 due to loading of the aircraft 100 that causes the load on the piston 124 to exceed the first breakout compression friction force. After exceeding the first breakout compression friction force, the second load causes the shock strut 116 to transition from the static state to a dynamic state where the piston 124 is in motion relative to the cylinder 122 and motion of the piston 124 compresses the gas in the shock strut 116 and causes a significant change in gas pressure. The shock strut 116 remains in the dynamic state until point 310 at a third time $t_3$ when the load on the shock strut 116 is balanced by the force applied to the piston 124 of the shock strut 116 by the gas in the shock strut 116, which is the force corresponding to point 312 (i.e., the pressure corresponding to point 312 multiplied by the effective area of the piston 124), and the friction force (i.e., the dynamic friction force, which instantly becomes static friction at time $t_3$). The computer system 112 determines the friction force at time $t_3$ using the friction model 138 for the shock strut 116 based on the gas pressure and gas temperature at time $t_3$ and adds the friction force to the force applied to the piston 124 of the shock strut 116 by the gas in the shock strut 116 to determine the load $L_3$ at time $t_3$.

Subsequent to time $t_3$, the load on the shock strut 116 is reduced in the scenario depicted in FIG. 3. Such a situation could occur, for example, if first cargo was incorrectly loaded on the aircraft 100 before second cargo was unloaded from the aircraft 100, and the first cargo blocks access to the second cargo. The first cargo would need to be unloaded and then the second cargo could be unloaded.

When the load on the shock strut 116 is reduced subsequent to time $t_3$ when the shock strut 116 is in a static state, the reduction of the load causes a reduction of static friction force until the load on the piston 124 reaches an expansion breakout static friction force. The expansion breakout static friction force is the force corresponding to point 314 in FIG. 3. During unloading of the shock strut 116 after time $t_3$, the load on the shock strut 116 is determined by the computer system 112 based on load delta values for particular times until the load is reduced below the expansion breakout static friction force. The load on the shock strut 116 is calculated as the load $L_3$ minus the load delta value. The load delta value is the load sensor value at time $t_3$ minus the load sensor value at any time from $t_3$ up to a time when the load on the shock-gas strut 116 corresponds to the expansion breakout static friction.

When the load is reduced below the expansion breakout static friction, the shock strut 116 becomes a dynamic system and the piston 124 moves relative to the cylinder 122 allowing expansion of the gas in the shock strut 116. The expansion of the gas causes a significant reduction of gas pressure, which indicates that the shock strut 116 is in the dynamic state. The piston 124 continues to move until a time $t_4$ when the load on the shock strut 116, which is the load corresponding to point 316, is balanced by the force applied to the piston 124 of the shock strut 116 by the gas in the shock strut 116, which is the force corresponding to point 318 in FIG. 3, and the friction force (i.e., the dynamic friction, which instantly becomes the static friction at time $t_4$). The computer system 112 determines the friction force using the friction model 138 for the shock strut 116 based on the gas pressure and gas temperature at time $t_4$. The computer system 112 determines the load on the shock strut 116 at time $t_4$ as the force applied to the piston 124 of the shock strut 116 by the gas minus the friction force. The force applied to the piston 124 of the shock strut 116 by the gas at time $t_4$ (i.e., the gas pressure at time $t_4$ multiplied by the effective area of the piston) corresponds to the force associated with point 318 in FIG. 3.

When the load on the shock strut 116 is further reduced due to further unloading of the aircraft 100, the gas pressure of the shock strut 116 remains at the pressure corresponding to point 316 until the load on the shock strut 116 is reduced below a second expansion breakout static friction force. The second expansion breakout static friction force corresponds to the force at point 320. When the load on the shock strut 116 is reduced below the second expansion breakout static friction force, the shock strut 116 becomes a dynamic system and the piston 124 moves to accommodate expansion of the gas until a time $t_5$ when the shock strut 116 becomes a dynamic system due to the load being balanced by the force applied to the piston 124 of the shock strut 116 by the gas in the shock strut 116 and the friction force (i.e., the dynamic friction, which instantly becomes the static friction at time $t_5$). The load on the shock strut 116 when the shock strut 116 becomes the static system corresponds to point 322.

Figure 4:
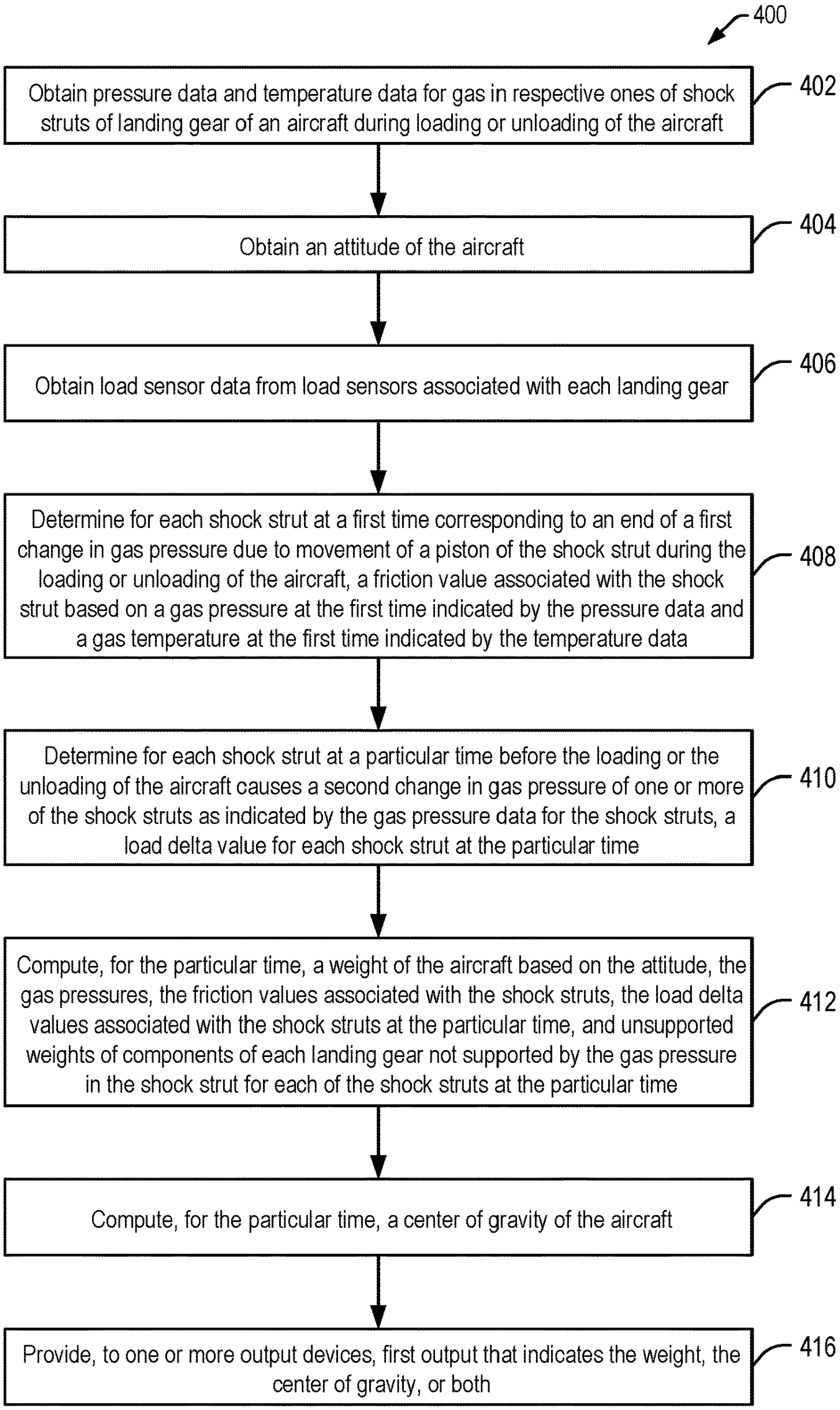
FIG. 4 is a flow chart of an implementation of a method of determination of a weight and CG of the aircraft.

FIG. 4 depicts a flow chart of an implementation of a method 400 of determination of a weight and CG of the aircraft 100. The method 400 may be performed by the computer system 112 by execution of the weight and balance instructions 136 by the processor 128. The method 400, at block 402, includes obtaining pressure data and temperature data for gas in respective ones of shock struts 116 of landing gear 106 of an aircraft 100 during loading or unloading of the aircraft 100. The pressure data is obtained from pressure sensors 140 and the temperature data is obtained from temperature sensors 142.

The method 400, at block 404 includes obtaining an attitude of the aircraft 100. The attitude is obtained by analyzing attitude data from the attitude sensor 146. Angles of interest associated with angles of the landing gear 106 relative to vertical are determined based on the attitude and parameters associated with the aircraft 100 (e.g., the angle θ and the values of Δnlg and Δmlg) retrieved from the data 134. Trigonometric relations applied to the angles of interest are used in calculations to determine vertical components of load applied to the shock struts 116 of the landing gear 106. The vertical components of load are used in determining the weight of the aircraft 100 and the CG of the aircraft 100.

The method 400, at block 406, includes obtaining load sensor data from load sensors associated with each landing gear. The load sensor data is obtained from load sensors 144. The load sensor data is used to determine load delta values of loads applied to the shock struts 116.

The method 400, at block 408, includes determining for each shock strut 116 for a first time corresponding to an end of a first change in gas pressure due to movement of a piston 124 of the shock strut 116 during the loading or unloading of the aircraft 100, a friction value associated with the shock strut 116 based on a gas pressure at the first time indicated by the pressure data and a gas temperature at the first time indicated by the temperature data. The first time for a shock strut 116 corresponds to a time when the shock strut 116 transitions from a dynamic state where the gas pressure of the shock strut 116 is changing, to a static state where the gas pressure of the shock strut is constant. The first time is determined by analyzing pressure data for the shock strut 116. The friction value for a particular shock strut 116 is determined using a friction model 138 for the particular shock strut 116.

The method 400, at block 410, includes determining for each shock strut 116 for a particular time before the loading or the unloading of the aircraft 100 causes a second change in pressure of one or more of the shock struts 116 as indicated by the gas pressure data for the shock struts 116, a load delta value for each shock strut 116 at the particular time. The load delta value for the particular time is the load value based on the load sensor data at the particular time minus the load value based on the load sensor data at the first time.

The method 400, at block 412, includes computing, for the particular time, a weight of the aircraft 100 based on the attitude, the gas pressures, the friction values associated with the shock struts 116, the load delta values associated with the shock struts 116 at the particular time, and unsupported weights of components of each landing gear 106 not supported by the gas pressure in the shock strut 116 for each of the shock struts 116 at the particular time. The weight of aircraft 100 at the particular time is a sum of a vertical load associated with each landing gear 106.

The vertical load associated with a particular landing gear 106 is calculated as a vertical component of force applied to the shock strut 116 of the particular landing gear 106 plus the weight of components of the particular landing gear 106 not supported by the gas pressure in the shock strut 116 of the particular landing gear 106. The force applied to the shock strut 116 of the particular landing gear is calculated as the gas pressure in the shock strut 116 of the particular landing gear 106 at the first time multiplied by an effective surface area of the piston 124 of the shock strut 116 of the particular landing gear 106 plus the friction value for the shock strut 116 of the particular landing gear 106 plus a load delta value for the shock strut 116 of the particular landing gear 106 at the particular time. The vertical component of the force applied to the shock strut 116 is determined based on an attitude of the aircraft 100 indicated by attitude data from an attitude sensor and an angle of the shock strut 116 relative to the aircraft 100.

The method 400, at block 414, includes computing, for the particular time, a CG of the aircraft 100. The CG is determined relative to ordinal axes of a coordinate system of interest based on normal distances of the vertical loads from the ordinal axes of the coordinate system. For example, if the coordinate system is an x, y coordinate system, the x coordinate for the CG for a second particular time is the sum of first values for each of the landing gear 106 divided by the weight of the aircraft 100 at the second particular time. The first value for each landing gear 106 is calculated as the product of vertical force on the landing gear 106 at the second particular time and the normal distance in the x, y plane of a ground contact location of the landing gear 106 from the y ordinal axis.

The method 400, at block 416, also includes providing first output to one or more output devices. The first output includes information indicating the weight of the aircraft 100, the CG of the aircraft 100, or both. The one or more output devices include the display device 148 of the aircraft 100 visible to flight crew members. The one or more output devices can also include one or more devices external to the aircraft 100. For example, the output can be provided to an electronic device 150 associated with a load master responsible for loading or unloading the aircraft 100. The loadmaster follows certain procedures for loading the aircraft 100 and the electronic device provides information to the load master about the load of the aircraft 100 and the CG via a second display device 152 coupled to the electronic device 150. The information may be based on general assumptions about the weight of the aircraft 100 at the start of loading and unloading and data regarding weight of cargo loaded on or removed from the aircraft 100. The electronic device 150 receives the weight and CG determined by the computer system 112 of the aircraft 100. If the weight and CG determined by the computer system 112 are not in general agreement with the weight and CG of the information, the load master can determine why there is not agreement before approving the aircraft 100 for flight.

Figure 5:
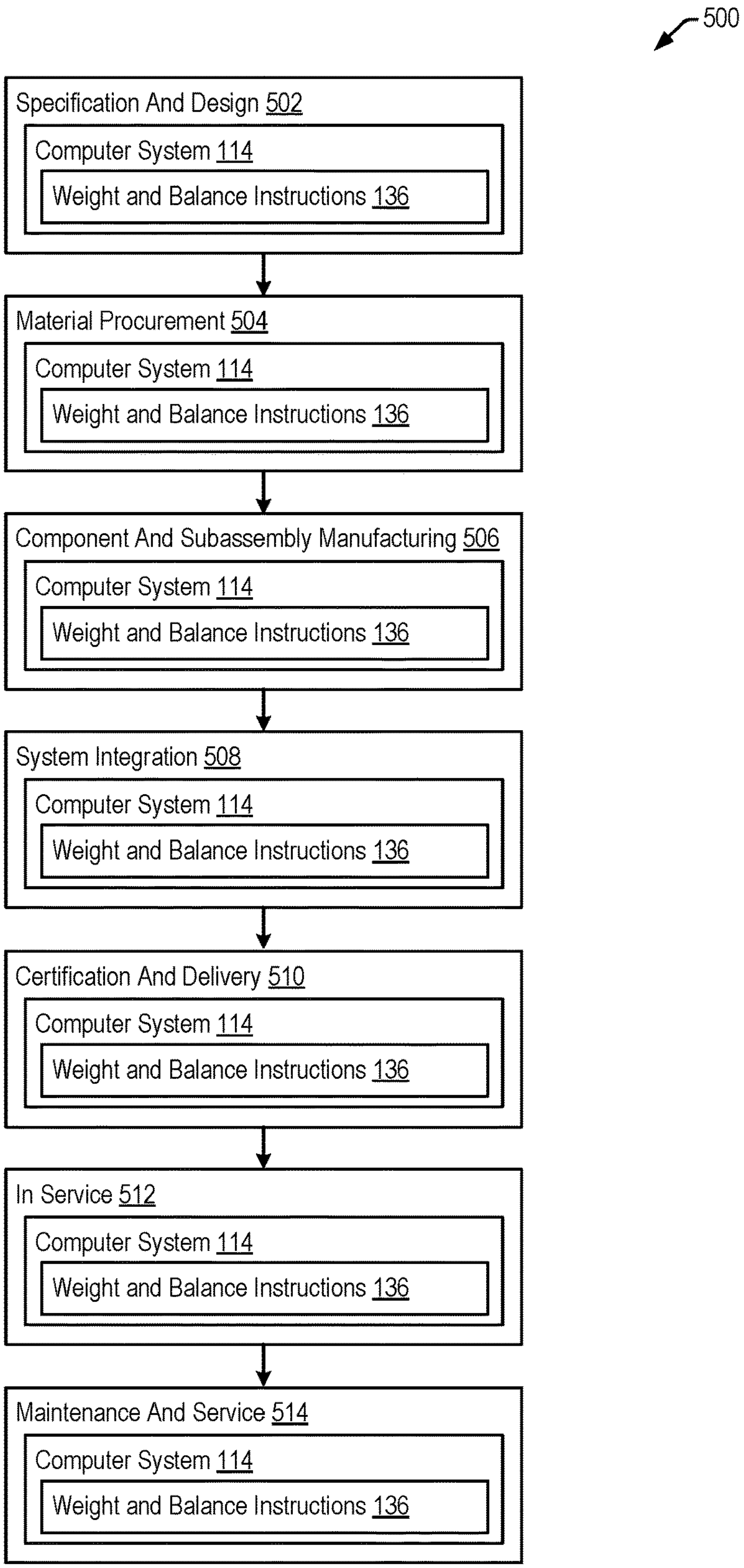
FIG. 5 is a flow chart illustrating a life cycle of an aircraft.

FIG. 5 is a flowchart illustrating a method 500 representing a life cycle of an aircraft 100 that includes the computer system 112 with the weight and balance instructions 136. During pre-production, the exemplary method 500 includes, at block 502, specification and design of the aircraft 100. During specification and design of the aircraft 100, the method 500 may include specification and design of the computer system 112 and parameters associated with the aircraft 100 that are subsequently used by the computer system 112 are set. Such parameters include angles from vertical of the landing gear 106 and effective ground contact locations of the landing gear 106. At block 504, the method 500 includes material procurement, which may include procuring the computer system 112 and other components of the aircraft 100. Unsupported weights of components of landing gear 106 are determined after material procurement and saved for subsequent use by the computer system 112 to determine weight and CG of the aircraft 100.

During production, the method 500 includes, at block 506, component and subassembly manufacturing and, at block 508, system integration of the aircraft 100. When the friction models 138 for the landing gear 106 are based on experimental data for the shock struts 116, experimental data is produced and processed to develop the friction models 138 for the shock struts 116. At block 510, the method 500 includes certification and delivery of the aircraft 100 and, at block 512, placing the aircraft 100 in service. Certification and delivery may include certification of the computer system 112 to place the aircraft 100 in service. While in service by a customer, the aircraft 100 may be scheduled for routine maintenance and service (which may also include modification, reconfiguration, refurbishment, and so on). At block 514, the method 500 includes performing maintenance and service on the aircraft 100, which may include performing maintenance and service on the computer system 112 to determine if the weight and balance instructions 136 are providing useful data regarding the weight and balance of the aircraft 100.

Each of the processes of the method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

Figure 6:
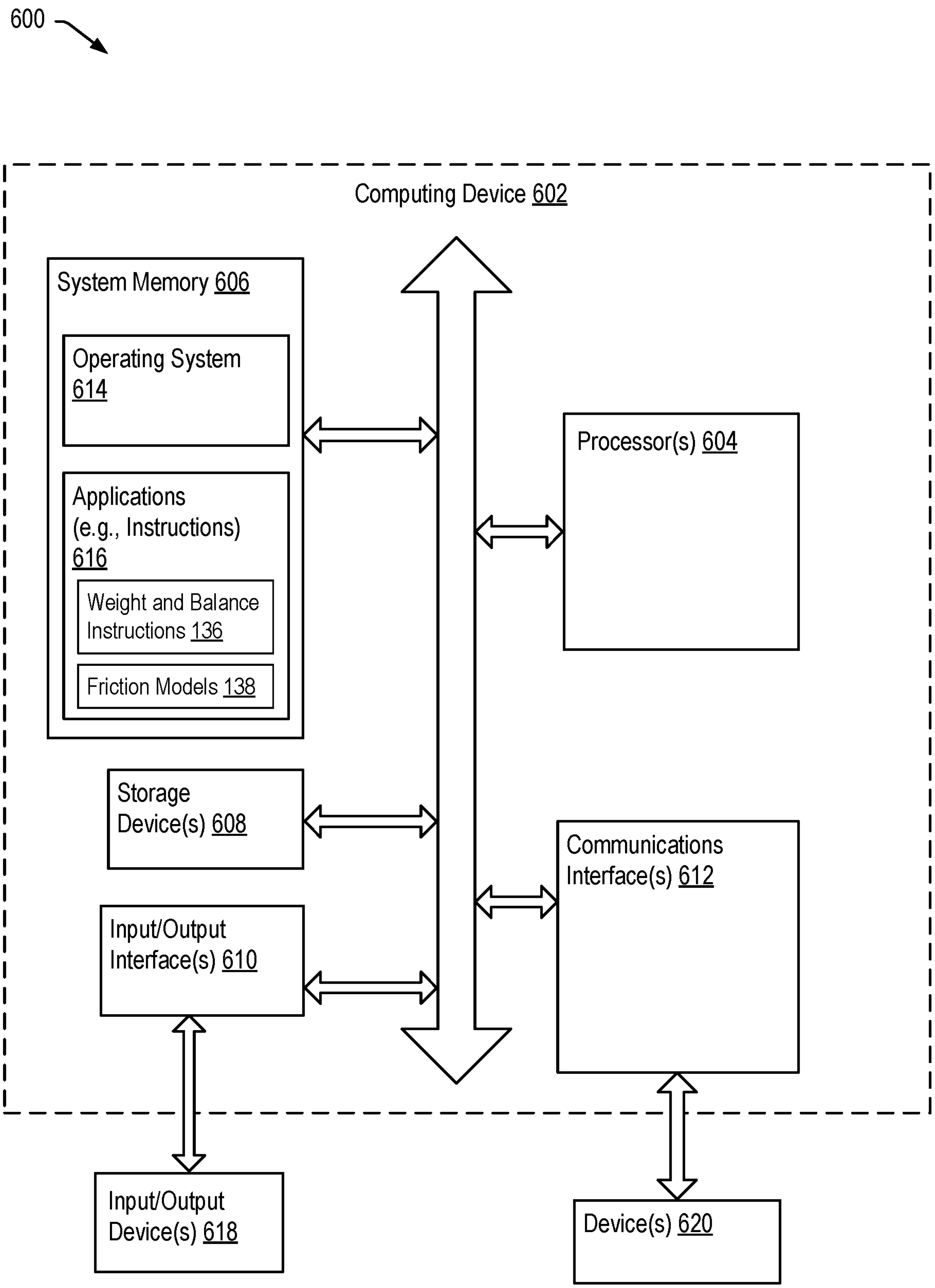
FIG. 6 is a block diagram of a computing environment including a computing device configured to support aspects of computer-implemented methods and computer-executable program instructions (or code) according to the present disclosure.

FIG. 6 is an illustration of a block diagram of a computing environment 600 including a computing device 602 configured to support implementations of computer-implemented methods and computer-executable program instructions (or code) according to the present disclosure. For example, the computing device 602, or portions thereof, may execute instructions to perform, or cause equipment to perform, operations described with reference to FIGS. 1-5. In implementations, computing devices 602 are, or are components of, the aircraft 100 and the computer system 112.

The computing device 602 includes one or more processors 604. The processor 604 communicates with a system memory 606, one or more storage devices 608, one or more input/output interfaces 610, one or more communications interfaces 612, or a combination thereof. The system memory 606 includes non-transitory computer readable media, including volatile memory devices (e.g., random access memory (RAM) devices), nonvolatile memory devices (e.g., read-only memory (ROM) devices, programmable read-only memory, and flash memory), or both. The system memory 606 includes an operating system 614, which may include a basic input/output system for booting the computing device 602 as well as a full operating system to enable the computing device 602 to interact with users, other programs, and other devices. The system memory 606 includes one or more applications 616 (e.g., instructions) which are executable by the processor 604. For example, when the computing device 602 is the computer system 112, the one or more applications 616 include the weight and balance instructions 136 and the friction models 138.

In some configurations, the processor 604 communicates with the one or more storage devices 608. For example, the storage device 608 includes non-transitory computer readable media that can include nonvolatile storage devices, such as magnetic disks, optical disks, or flash memory devices. The storage devices 608 can include both removable and non-removable memory devices. The storage devices 608 can be configured to store an operating system, images of operating systems, applications, and program data. In particular implementations, the system memory 606, the storage device 608, or both, include tangible computer-readable media incorporated in hardware and which are not signals.

In some configurations, the processor 604 communicates with the one or more input/output interfaces 610 that enable the computing device 602 to communicate with one or more input/output devices 618 to facilitate user interaction. The input/output interfaces 610 can include serial interfaces (e.g., universal serial bus (USB) interfaces or Institute of Electrical and Electronics Engineers (IEEE) interfaces), parallel interfaces, display adapters, audio adapters, and other interfaces ("IEEE" is a registered trademark of The Institute of Electrical and Electronics Engineers, Inc. of Piscataway, New Jersey). The input/output devices 618 can include keyboards, pointing devices, displays (e.g., one or more monitors, one or more gauges, etc.), speakers, microphones, touch screens, rotatable selectors, levers, knobs, slides, switches, and other devices. The processor 604 detects interaction events based on user input received via the input/output interfaces 610. Additionally, the processor 604 sends a display to a display device via the input/output interfaces 610.

In some configurations, the processor 604 can communicate with one or more devices 620 via the one or more communications interfaces 612. The one or more devices 620 can include external computing devices contacted via a communication network and controllers, sensors, and other devices coupled to the computing device 602 via wired or wireless local connections. For example, when the computing device 602 is the computer system 112, the computing device 602 is configured to communicate via the interface 612 with devices external to the aircraft 100 such as an electronic device associated with a loadmaster responsible for loading or unloading the aircraft 100. The one or more communications interfaces 612 may include wired Ethernet interfaces, IEEE 802 wireless interfaces, other wireless communication interfaces, one or more converters to convert analog signals to digital signals, electrical signals to optical signals, one or more converters to convert received optical signals to electrical signals, or other network interfaces.

In some implementations, a non-transitory, computer readable medium stores instructions that, when executed by one or more processors, cause the one or more processors to initiate, perform, or control operations to perform part or all of the functionality described above. For example, the instructions may be executable to implement one or more of the operations or methods of FIGS. 1-4. In some implementations, part or all of one or more of the operations or methods associated with FIGS. 1-4 may be implemented by one or more processors (e.g., one or more central processing units (CPUs), one or more graphics processing units (GPUs), one or more digital signal processors (DSPs)) executing instructions, by dedicated hardware circuitry, or any combination thereof.

Particular aspects of the disclosure are described below in sets of interrelated Examples:

According to Example 1, an aircraft comprises: a plurality of landing gear, wherein each landing gear of the plurality of landing gear includes a shock strut; the aircraft includes a plurality of sensors associated with each landing gear, wherein the plurality of sensors associated with each landing gear includes a pressure sensor configured to generate pressure data indicative of a gas pressure in the shock strut, and a temperature sensor configured to generate temperature data indicative of gas temperature in the shock strut; the aircraft includes a computer system, wherein the computer system is configured to: determine, for each shock strut of the plurality of landing gear for a first time corresponding to an end of a first change in the gas pressure due to movement of a piston of the shock strut during loading or unloading of the aircraft, a friction value associated with the shock strut based on the gas pressure at the first time indicated by the pressure data; compute, for a particular time before the loading or the unloading of the aircraft causes a second change in gas pressure of one or more of the shock struts as indicated by the pressure data for the shock struts, a weight of the aircraft based on the gas pressures of the shock struts at the first times and the friction values associated with the shock struts at the first times; and the computer system is configured to provide, to one or more display devices, first output that indicates the weight of the aircraft.

Example 2 includes the aircraft of Example 1, wherein: the weight of the aircraft at the particular time is a sum of a vertical load associated with each landing gear of the plurality of landing gear; the vertical load associated with a particular landing gear is calculated as a vertical component of force applied to the shock strut of the particular landing gear plus weight of components of the particular landing gear not supported by the gas pressure in the shock strut of the particular landing gear; the force applied to the shock strut of the particular landing gear is calculated as the gas pressure in the shock strut of the particular landing gear at the first time multiplied by an effective surface area of the piston of the shock strut of the particular landing gear plus the friction value for the shock strut of the particular landing gear plus a load delta value for the shock strut of the particular landing gear at the particular time; and the vertical component of the force applied to the shock strut is determined based on an attitude of the aircraft indicated by attitude data from an attitude sensor and an angle of the shock strut relative to the aircraft.

Example 3 includes the aircraft of Example 2, wherein: the plurality of sensors include load sensors configured to generate load sensor data associated with vertical loads applied by the landing gear to the aircraft; and the computer system is further configured to determine, for each shock strut of the plurality of landing gear for the particular time, the load delta value for the shock strut at the particular time as a load value indicated by the load sensor data at the particular time for the shock strut less a first load value indicated by the load sensor data at the first time for the shock strut.

Example 4 includes the aircraft of any of Example 1 to Example 3, wherein the computing system is further configured to: compute a center of gravity of the aircraft relative to ordinal axes of a coordinate system for the particular time based on vertical loads of each landing gear and distances of effective landing gear ground contact points normal to the ordinal axes of the landing gear; and provide, to the one or more display devices, second output that indicates the center of gravity.

Example 5 includes the aircraft of Example 4, wherein a location of an x coordinate for the center of gravity in an x, y coordinate system is a sum of first values for each landing gear divided by the weight of the aircraft, and wherein a first value of the first values for each landing gear is a vertical load of the vertical loads of the landing gear multiplied by a normal distance in the x, y plane of an effective ground contact location for the landing gear from a y ordinal axis.

Example 6 includes the aircraft of Example 4, wherein the computer system is further configured to change a status of the aircraft to a grounded status in response to a determination that the center of gravity of the aircraft is outside of a threshold center of gravity region.

Example 7 includes the aircraft of any of Example 1 to Example 6, wherein the computer system is further configured to change a status of the aircraft to a grounded status in response to a determination that the weight of the aircraft is above a threshold weight.

Example 8 includes the aircraft of any of Example 1 to Example 7, wherein the computer system is further configured to use a friction model for each shock strut to determine the friction value associated with each shock strut at the first time.

Example 9 includes the aircraft of Example 8, wherein the computer system is further configured to adjust the friction model for a particular shock strut based on historic data for the particular shock strut stored by the computer system during each loading operation and unloading operation to compensate for changes in shock strut friction with time.

Example 10 include the aircraft of any of Example 1 to Example 9, wherein the computer system is configured to analyze the pressure data, the temperature data, or both, for each shock strut of the plurality of landing gear to determine the first time for each shock strut of the landing gear.

According to Example 11, a method of determining weight of an aircraft having a plurality of landing gear, wherein each landing gear includes a shock strut, comprises: obtaining, at a computer system, pressure data and temperature data for gas in respective ones of shock struts of the plurality of landing gear during loading or unloading of the aircraft; determining, at the computer system for each shock strut of the plurality of landing gear at a first time corresponding to an end of a first change in gas pressure due to movement of a piston of the shock strut during the loading or the unloading of the aircraft, a friction value associated with the shock strut based on a gas pressure at the first time indicated by the pressure data and a gas temperature at the first time indicated by the temperature data; and computing, at the computer system for a particular time before the loading or the unloading of the aircraft causes a second change in gas pressure of one or more of the shock struts as indicated by the pressure data for the shock struts, a weight of the aircraft based on the gas pressures of the shock struts at the first times and the friction values associated with the shock struts at the first times.

Example 12 includes the method of Example 11, further comprising providing first output indicating the weight of the aircraft to one or more display devices, wherein the one or more display devices include a first display associated with a flight deck of the aircraft, a second display associated with a loadmaster associated with the aircraft, or both.

Example 13 includes the method of Example 12, further comprising: computing, at the computer system for the particular time, a center of gravity of the aircraft relative to ordinal axes of a coordinate system based on known positions of landing gear contact points of the plurality of landing gear and vertical loads associated with each landing gear at the particular time; and providing second output indicating the center of gravity of the aircraft to the one or more display devices.

Example 14 includes the method of any of Example 11 to Example 13, further comprising determining a vertical load in a first shock strut for the particular time, wherein said determining the vertical load comprises: determining a load delta value for the particular time for the first shock strut; determining a force applied to the first shock strut by multiplying the gas pressure of the first shock strut at the first time by an effective surface area of the piston of the first shock strut and adding the friction value at the first time for the first shock strut; determining a vertical component of the force based on an attitude of the aircraft and an angle of the first shock strut relative to the aircraft; adding the load delta value to the vertical component; and adding unsupported weight of components of landing gear associated with the first shock strut not supported by the gas pressure in the first shock strut.

Example 15 includes the method of Example 14, wherein said determining the load delta value for the particular time for the first shock strut further comprises: obtaining, at the computer system, load sensor data associated with a vertical load applied by a first landing gear associated with first shock strut to the aircraft from one or more load sensors associated with the first landing gear; and determining, at the computer system the load delta value for the first shock strut at the particular time as a load value indicated by the load sensor data at the particular time less a first load value indicated by the load sensor data at the first time.

Example 16 includes the method of any of Example 11 to Example 15, further comprising analyzing the pressure data, the temperature data, or both for each shock strut to determine the first time for each shock strut.

Example 17 includes the method of any of Example 11 to Example 16, further comprising changing a status of the aircraft to a grounded status responsive to the weight of the aircraft above a threshold value.

According to Example 18, a device includes: a memory configured to store instructions; and a processor configured to execute the instructions to perform the method of any of Example 11 to Example 17.

According to Example 19, a non-transitory computer-readable medium stores instructions that, when executed by a processor, cause the processor to perform the method of any of Example 11 to Example 17.

According to Example 20, an apparatus includes means for carrying out the method of any of Example 11 to Example 17.

According to Example 21, a non-transitory computer-readable medium comprising instructions executable by one or more processors associated with an aircraft to: obtain pressure data and temperature data for gas in respective ones of shock struts of landing gear of the aircraft during loading or unloading of the aircraft; obtain an attitude of the aircraft: obtain load sensor data from load sensors associated with each landing gear, wherein the load sensor data for each landing gear corresponds to vertical load exerted by the landing gear on the aircraft; determine for each shock strut for a first time corresponding to an end of a first change in gas pressure due to movement of a piston of the shock strut during the loading or the unloading of the aircraft, a friction value associated with the shock strut based on a gas pressure at the first time indicated by the pressure data and a gas temperature at the first time indicated by the temperature data; determine for each shock strut for a particular time before the loading or the unloading of the aircraft causes a second change in gas pressure of one or more of the shock struts as indicated by the pressure data for the shock struts, a load delta value for each shock strut at the particular time; compute, for the particular time, a weight of the aircraft based on the attitude, the gas pressures, the friction values associated with the shock struts, the load delta values associated with the shock struts at the particular time, and unsupported weights of components of each landing gear not supported by the gas pressure in the shock strut for each of the shock struts at the particular time; and provide, to one or more display devices, first output that indicates the weight of the aircraft.

Example 22 includes the non-transitory computer-readable medium of Example 21, wherein the instructions are further configured to compute a center of gravity of the aircraft for the particular time.

Example 23 includes the non-transitory computer-readable medium of Example 22, wherein the instructions are further configured to provide second output that indicates the center of gravity to the one or more display devices.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. An aircraft comprising:

a plurality of landing gear, wherein each landing gear of the plurality of landing gear includes a shock strut;

a plurality of sensors associated with each landing gear, wherein the plurality of sensors includes a pressure sensor configured to generate pressure data indicative of a gas pressure in the shock strut, and a temperature sensor configured to generate temperature data indicative of a gas temperature in the shock strut; and a computer system, wherein the computer system is configured to:

analyze the pressure data for each shock strut of the plurality of landing gear to determine a first time for each shock strut corresponding to an end of a first change in the gas pressure due to movement of a piston of the shock strut during loading or unloading of the aircraft;

determine, for each shock strut of the plurality of landing gear for the first time, a friction value associated with the shock strut based on the gas pressure at the first time indicated by the pressure data and a gas temperature at the first time indicated by the temperature data;

compute, for a particular time before the loading or the unloading of the aircraft causes a second change in gas pressure of one or more of the shock struts as indicated by the pressure data for the shock struts, a weight of the aircraft based on the gas pressures of the shock struts at the first times and the friction values associated with the shock struts at the first times; and provide, to one or more display devices, first output that indicates the weight of the aircraft.

2. The aircraft of claim 1, wherein:

the weight of the aircraft at the particular time is a sum of a vertical load associated with each landing gear of the plurality of landing gear;

the vertical load associated with a particular landing gear is calculated as a vertical component of force applied to the shock strut of the particular landing gear plus weight of components of the particular landing gear not supported by the gas pressure in the shock strut of the particular landing gear;

the force applied to the shock strut of the particular landing gear is calculated as the gas pressure in the shock strut of the particular landing gear at the first time multiplied by an effective surface area of the piston of the shock strut of the particular landing gear plus the friction value for the shock strut of the particular landing gear plus a load delta value for the shock strut of the particular landing gear at the particular time; and the vertical component of the force applied to the shock strut is determined based on an attitude of the aircraft indicated by attitude data from an attitude sensor and an angle of the shock strut relative to the aircraft.

3. The aircraft of claim 2, wherein:

the plurality of sensors include load sensors configured to generate load sensor data associated with vertical loads applied by the landing gear to the aircraft; and the computer system is further configured to determine, for each shock strut of the plurality of landing gear for the particular time, the load delta value for the shock strut at the particular time as a load value indicated by the load sensor data at the particular time for the shock strut less a first load value indicated by the load sensor data at the first time for the shock strut.

4. The aircraft of claim 1, wherein the computer system is further configured to:

compute a center of gravity of the aircraft relative to ordinal axes of a coordinate system for the particular time based on vertical loads applied to each landing gear and distances of effective ground contact locations of the landing gear normal to the ordinal axes; and provide, to the one or more display devices, second output that indicates the center of gravity.

5. The aircraft of claim 4, wherein:

a location of an x coordinate for the center of gravity in an x, y coordinate system is a sum of first values for each landing gear divided by the weight of the aircraft; and a first value of the first values for each landing gear is a vertical load of the vertical loads of the landing gear multiplied by a normal distance in the x, y plane of an effective ground contact location for the landing gear from a y ordinal axis.

6. The aircraft of claim 4, wherein the computer system is further configured to change a status of the aircraft to a grounded status in response to a determination that the center of gravity of the aircraft is outside of a threshold center of gravity region.

7. The aircraft of claim 1, wherein the computer system is further configured to change a status of the aircraft to a grounded status in response to a determination that the weight of the aircraft is above a threshold weight.

8. The aircraft of claim 1, wherein the computer system is further configured to use a friction model for each shock strut to determine the friction value associated with each shock strut at the first time.

9. The aircraft of claim 8, wherein the computer system is further configured to adjust the friction model for a particular shock strut based on historic data for the particular shock strut stored by the computer system during each loading operation and unloading operation to compensate for changes in shock strut friction with time.

10. The aircraft of claim 1, wherein the plurality of landing gear include a nose landing gear, a right main landing gear, and a left main landing gear.

11. A method of determining weight of an aircraft having a plurality of landing gear, wherein each landing gear includes a shock strut, the method comprising:

obtaining, at a computer system, pressure data and temperature data for gas in respective ones of shock struts of the plurality of landing gear during loading or unloading of the aircraft;

analyzing, at the computer system, the pressure data for each shock strut of the plurality of landing gear to determine a first time for each shock strut corresponding to an end of a first change in gas pressure due to movement of a piston of the shock strut during loading or unloading of the aircraft;

determining, by the computer system for each shock strut of the plurality of landing gear for the first time, a friction value associated with the shock strut based on a gas pressure at the first time indicated by the pressure data and a gas temperature at the first time indicated by the temperature data; and computing, by the computer system for a particular time before the loading or the unloading of the aircraft causes a second change in gas pressure of one or more of the shock struts as indicated by the pressure data for the shock struts, a weight of the aircraft based on the gas pressures of the shock struts at the first times and the friction values associated with the shock struts at the first times.

12. The method of claim 11, further comprising providing first output indicating the weight of the aircraft to one or more display devices, wherein the one or more display devices include a first display associated of the aircraft, a second display associated with a loadmaster associated with the aircraft, or both.

13. The method of claim 12, further comprising:

computing, by the computer system for the particular time, a center of gravity of the aircraft relative to ordinal axes of a coordinate system based on known positions of effective ground contact locations of landing gear of the plurality of landing gear and vertical loads associated with each landing gear at the particular time; and providing second output indicating the center of gravity of the aircraft to the one or more display devices.

14. The method of claim 11, further comprising determining a vertical load in a first shock strut for the particular time, wherein said determining the vertical load comprises:

determining a load delta value for the particular time for the first shock strut;

determining a force applied to the first shock strut by multiplying the gas pressure of the first shock strut at the first time by an effective surface area of the piston of the first shock strut and adding the friction value at the first time for the first shock strut;

determining a vertical component of the force based on an attitude of the aircraft and an angle of the first shock strut relative to the aircraft;

adding the load delta value to the vertical component; and adding unsupported weight of components of landing gear associated with the first shock strut not supported by the gas pressure in the first shock strut.

15. The method of claim 14, wherein said determining the load delta value for the particular time for the first shock strut further comprises:

obtaining, at the computer system, load sensor data associated with a vertical load applied by a first landing gear associated with the first shock strut to the aircraft from one or more load sensors associated with the first landing gear; and determining, by the computer system the load delta value for the first shock strut at the particular time as a load value indicated by the load sensor data at the particular time less a first load value indicated by the load sensor data at the first time.

16. The method of claim 11, further comprising:

computing a center of gravity of the aircraft relative to ordinal axes of a coordinate system for the particular time based on vertical loads applied to each landing gear and distances of effective ground contact locations of the landing gear normal to the ordinal axes; and changing a status of the aircraft to a grounded status responsive to a determination that the center of gravity of the aircraft is outside of a threshold center of gravity region.

17. The method of claim 11, further comprising changing a status of the aircraft to a grounded status responsive to the weight of the aircraft being above a threshold value.

18. A non-transitory computer-readable medium comprising instructions executable by one or more processors associated with an aircraft, wherein the instructions are configured to:

obtain pressure data and temperature data for gas in respective ones of shock struts of landing gear of the aircraft during loading or unloading of the aircraft;

obtain an attitude of the aircraft;

obtain load sensor data from load sensors associated with each landing gear, wherein the load sensor data for each landing gear corresponds to vertical load exerted by the landing gear on the aircraft;

analyze the pressure data for each shock strut of the landing gear to determine a first time for each shock strut corresponding to an end of a first change in gas pressure due to movement of a piston of the shock strut during loading or unloading of the aircraft;

determine, for each shock strut for the first time, a friction value associated with the shock strut based on a gas pressure at the first time indicated by the pressure data and a gas temperature at the first time indicated by the temperature data;

determine for each shock strut for a particular time before the loading or the unloading of the aircraft causes a second change in gas pressure of one or more of the shock struts as indicated by the pressure data for the shock struts, a load delta value for each shock strut at the particular time;

compute, for the particular time, a weight of the aircraft based on the attitude, the gas pressures, the friction values associated with the shock struts, the load delta values associated with the shock struts at the particular time, and unsupported weights of components of each landing gear not supported by the gas pressure in the shock strut for each of the shock struts at the particular time; and provide, to one or more display devices, first output that indicates the weight of the aircraft.

19. The non-transitory computer-readable medium of claim 18, wherein the instructions are further configured to compute a center of gravity of the aircraft for the particular time.

20. The non-transitory computer-readable medium of claim 19, wherein the instructions are further configured to provide second output that indicates the center of gravity to the one or more display devices.

* * * * *